March 12, 1940.  A. H. HAGEN  2,193,407
ROPE CLAMP
Filed Nov. 8, 1939
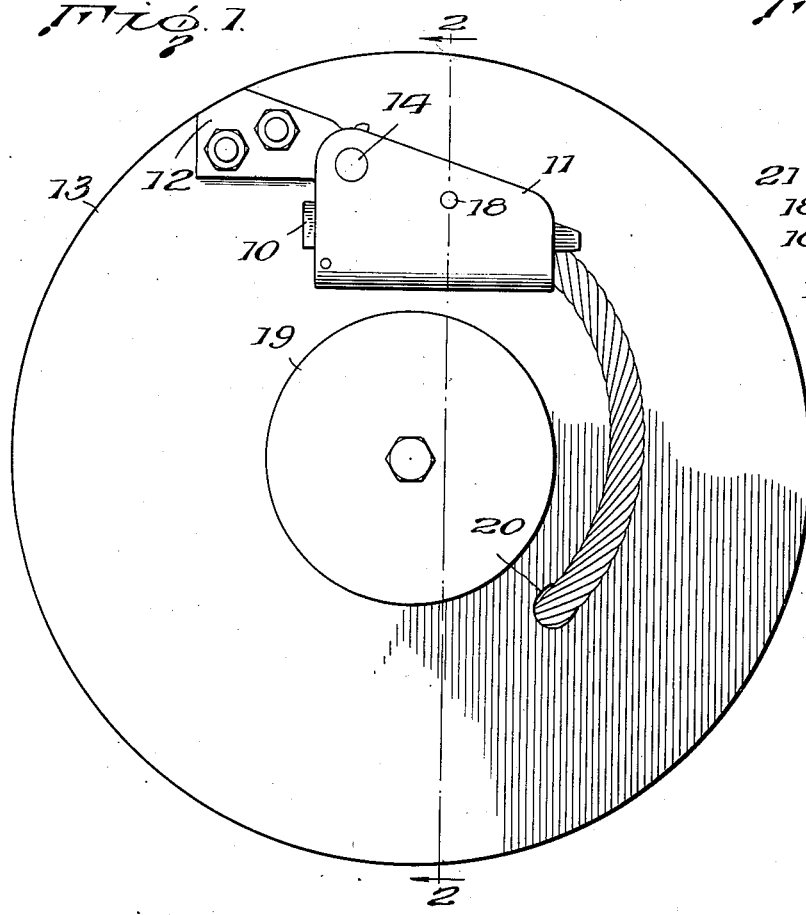
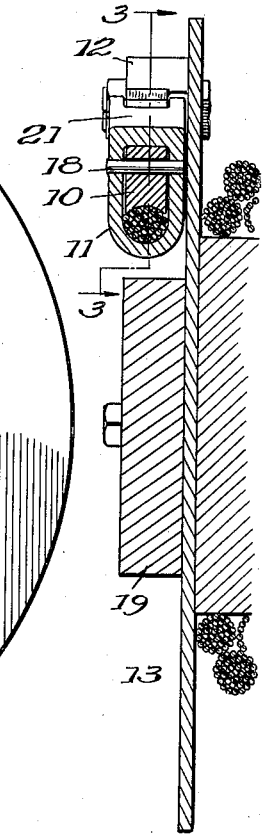
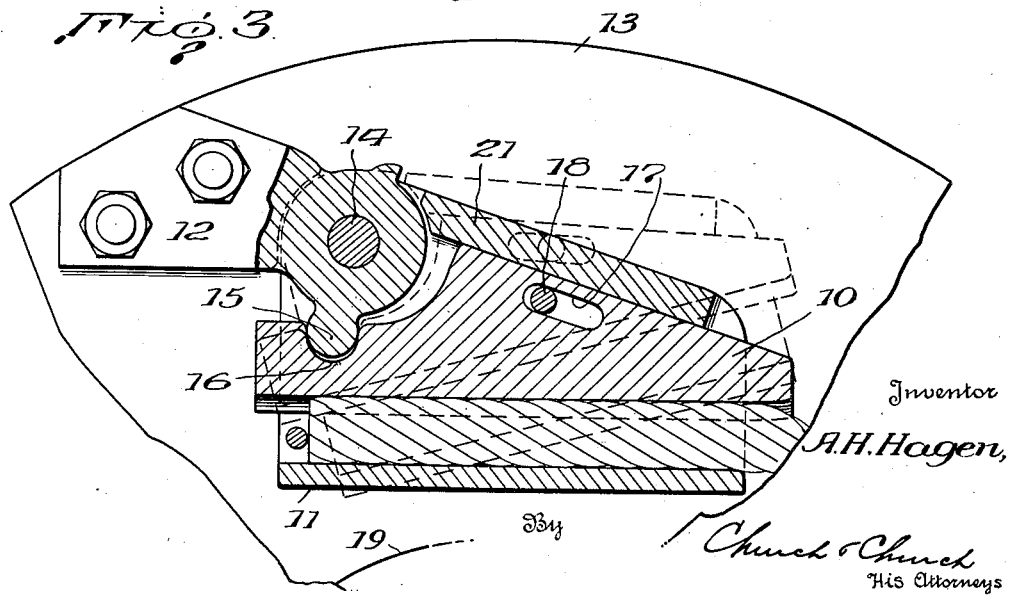
Inventor
A. H. Hagen,
By Church & Church
His Attorneys Patented Mar. 12, 1940

2,193,407

UNITED STATES PATENT OFFICE 2,193,407

ROPE CLAMP

Arthur H. Hagen, Globe, Ariz., assignor of one-half to Harry J. Hagen, Alpine, Ariz.

Application November 8, 1939, Serial No. 303,460

6 Claims. (Cl. 242—117)

This invention relates to improvements in rope clamps and, particularly, to a clamp for use on rope spools or drums.

The primary object of the invention is to provide a rope clamp particularly adapted for use on rope spools or drums.

A further object is to provide a rope clamp of simple but sturdy construction.

Still another object of the invention is to provide a rope clamp which will grip or clamp the rope with increasing force or pressure as the longitudinal pull on the rope increases.

More specifically, the present clamp comprises two clamping members pivoted eccentrically of each other so as to move relatively longitudinally of one another when they are turned on their respective pivotal centers. There is a rope receiving recess between said clamping members and the latter have abutting surfaces, one or both of which are inclined longitudinally of the recess. When the two members are moved relatively to each other by their pivotal motions, these abutting surfaces cause the members to clamp the rope between them with increasing force or pressure.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a plan view of the present clamp mounted on the end flange of a rope spool or drum;

Fig. 2 is a sectional view on the line 2—2 of Fig. 1; and

Fig. 3 is a sectional view on the line 3—3 of Fig. 2.

The device comprises the two clamping members 10, 11, one of which might be described as the block 10, while the member 11 is preferably of channel formation in order to impart strength thereto. The essential point is to provide a rope-receiving recess between the two members and, by making member 11 of channel formation, the bottom thereof affords a semi-circular recess for reception of the rope.

Member 11 is pivotally mounted on a mounting block 12 rigid on the flange 13 of the spool or drum, said block 12 being slightly spaced at one extremity from the flange to afford clearance for one side of member 11. Block 12 may be bolted on the flange and member 11 is pivoted on said block by pivot pin 14. Adjacent pivot pin 14, block 12 is formed with a rounded projection 15 which is positioned in a recess 16 in clamping member 10, the latter being located between the sides of the channel-shaped member 11. Thus, projection 15 serves as a pivotal support for member 10.

With this arrangement, the members 10, 11, are pivoted on eccentric centers and, as they turn on their respective centers, they will move longitudinally with respect to one another. This relative longitudinal movement is utilized for forcing the two members toward each other to clamp a rope in the bottom of member 11. For this purpose, at least one of the clamping members is formed with a longitudinally inclined surface which abuts a fixed portion of the other member, so that when the two members are moved lengthwise relatively to each other this inclined surface will force them together to firmly grip a rope between them. For instance, member 10 may be formed with an elongated inclined slot 17 in which a fixed cross pin 18 in member 11 engages. Thus, when member 10 moves lengthwise of member 11, pin 18 will force member 10 downwardly, or toward the semi-circular bottom of member 11. The flange 13 may be provided with an abutment or raised portion 19 to limit the swinging or turning motion of clamping member 11 and, by having the end of the rope threaded through an opening 20 in the drum flange, longitudinal pull on the rope will cause the clamping members to pivot or swing toward said stop or abutment. It is the swinging motion in this direction which causes the two members to move relatively to each other and clamp or grip the rope as described. When the members are swung in the opposite direction, or away from stop 19, they move apart to release the rope. In this connection, pin 18 will serve not only to raise the member 10 at this time, but will retain the two members separated to facilitate insertion of a rope end in the bottom of member 11 or between the two members.

It will be understood that the normal usage of the present clamp is such that rather severe strains will be imposed on pin 18. For this reason, the top of channel member 11 is preferably closed by a top plate 21 which is inclined with respect to the bottom of said member and the upper surface of member 10 is likewise inclined and abuts against said inclined top plate. Hence, these complementary inclined surfaces will cause the two members to move toward each other and grip a rope between them when they are swung in the proper direction on their pivotal centers.

As a consequence, pin 18 is relieved of undue strain, although it will always properly support the member 10 in proper spaced relation to member 11 when the two members are moved apart for insertion of the rope end.

What I claim is:

1. In a rope clamp, a pivoted channel-shaped housing adapted to receive a rope, a pivoted clamp block in said housing, said block being pivoted to swing about a center eccentric of the pivotal center of the housing whereby pivotal movement of the housing and block will effect relative longitudinal movement of said elements, and a longitudinally extending inclined surface on one of said elements engaging an abutting surface on the other element.

2. In a rope clamp for flanged rope spools and drums, a channel-shaped housing pivoted on a flange of the spool, a clamping block in said housing, abutting inclined surfaces extending longitudinally of said housing and block, and means on said flange pivotally retaining the block in said housing, the pivotal center of the block being arranged eccentrically of the pivotal center of the housing to effect a relative longitudinal movement of said elements when they are turned on their respective centers.

3. In a rope clamp for rope spools and drums having rope retaining flanges, a plate on one of said flanges, a channel-shaped housing pivoted on said plate, an abutment on said plate, a clamping block pivoted on said abutment and positioned between the sides of said housing, the hinge connection of the block being arranged eccentrically of the pivotal center of the housing, an inclined surface extending longitudinally of said block, and a fixed member spanning the space between the sides of the housing and engaging against the inclined surface of said block.

4. In a rope clamp, a supporting plate, a protuberance on said plate, a clamping block swingable on said protuberance as a center, a channel-shaped housing pivoted eccentrically of said protuberance with the side walls of said housing embracing opposite sides of said block, an inclined surface on said block, and a complemental inclined surface on said housing abutting the inclined surface of the block, the eccentricity of the pivotal centers of the block and housing effecting a relative longitudinal movement of said inclined surfaces upon pivotal motion of the block and housing.

5. In a rope clamp, a channel-shaped housing, a clamping block between the sides of the housing, there being a space for the rope between said block and the bottom of the housing, said housing and block being pivoted to swing about eccentric centers, one of said members being formed with a surface inclined with respect to the bottom of said housing, and the other member being formed with a fixed portion abutting said inclined surface, the eccentricity of said pivotal centers effecting a relative movement of said abutting fixed portion and inclined surface longitudinally of the latter when the block and housing are swung on their pivotal centers.

6. In a rope clamp, two pivoted clamping members having an elongated rope-receiving space between them, said members being pivoted to swing about centers arranged eccentrically of one another, and cooperating, abutting surfaces on said members, one of said surfaces being inclined longitudinally of said rope-receiving space whereby a relative movement of said members longitudinally of said space will force said members toward each other.

ARTHUR H. HAGEN.